United States Patent
Luo et al.

(10) Patent No.: US 10,106,662 B2
(45) Date of Patent: Oct. 23, 2018

(54) THERMOPLASTIC POROMERIC POLISHING PAD

(71) Applicant: Rohm and Haas Electronic Materials CMP Holdings, Inc., Newark, DE (US)

(72) Inventors: Shuiyuan Luo, Newark, DE (US); George C. Jacob, Newark, DE (US); Henry Sanford-Crane, Elkton, MD (US); Koichi Yoshida, Kyoto (JP); Katsumasa Kawabata, Kyoto (JP); Shusuke Kitawaki, Osaka (JP); Shogo Takahashi, Shimane (JP); Yosuke Takei, Shimane (JP)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 214 days.

(21) Appl. No.: 15/229,017

(22) Filed: Aug. 4, 2016

(65) Prior Publication Data

US 2018/0037706 A1     Feb. 8, 2018

(51) Int. Cl.
*C08J 9/00* (2006.01)
*B24B 37/24* (2012.01)

(52) U.S. Cl.
CPC ............ *C08J 9/0061* (2013.01); *B24B 37/24* (2013.01); *C08J 2205/05* (2013.01); *C08J 2207/00* (2013.01); *C08J 2375/04* (2013.01); *C08J 2475/04* (2013.01)

(58) Field of Classification Search
CPC ......... B24B 37/24; B24B 37/26; B24B 37/22; B24D 3/28; B24D 11/001; B24D 11/00; B24D 11/005; B24D 11/02

USPC .............. 451/526–539; 51/296, 298
See application file for complete search history.

(56) References Cited

U.S. PATENT DOCUMENTS 4,629,473 A * 12/1986 Ruid .................. B24D 11/02
                                                           51/295
6,089,966 A     7/2000 Arai et al.
6,126,532 A * 10/2000 Sevilla ................ B24B 37/22
                                                           451/526

(Continued)

FOREIGN PATENT DOCUMENTS

JP       2013208696 A     10/2013

OTHER PUBLICATIONS

Copending U.S. Appl. No. 15/228,996.
Copending U.S. Appl. No. 15/228,988.
Copending U.S. Appl. No. 15/229,009.

*Primary Examiner* — Monica Carter
*Assistant Examiner* — Lauren Beronja
(74) *Attorney, Agent, or Firm* — Blake T. Biederman

(57) ABSTRACT

The porous polyurethane polishing pad includes a porous matrix having large pores that extend upward from a base surface and open to an upper surface. The large pores are interconnected with small pores. The porous matrix is a blend of two thermoplastic polymers. The first thermoplastic polyurethane has by molecular percent, 45 to 60 adipic acid, 10 to 30 MDI-ethylene glycol and 15 to 35 MDI and an Mn of 40,000 to 60,000 and a Mw of 125,000 to 175,000 and an Mw to Mn ratio of 2.5 to 4 The second thermoplastic polyurethane has by molecular percent, 40 to 50 adipic acid, 20 to 40 adipic acid butane diol, 5 to 20 MDI-ethylene glycol and 5 to 25 MDI and an Mn of 60,000 to 80,000 and a Mw of 125,000 to 175,000 and an Mw to Mn ratio of 1.5 to 3.

10 Claims, 8 Drawing Sheets

(56) References Cited

U.S. PATENT DOCUMENTS

| | | | |
|---|---|---|---|
| 6,241,596 B1 | 6/2001 | Osterheld et al. | |
| 6,428,405 B1 | 8/2002 | Tsuchiya | |
| 7,311,862 B2 * | 12/2007 | Prasad | B24B 37/24 |
| | | | 264/28 |
| 8,162,728 B2 * | 4/2012 | James | B24B 37/24 |
| | | | 428/304.4 |
| 8,408,977 B2 | 4/2013 | James et al. | |
| 2001/0044263 A1 | 11/2001 | Andideh et al. | |
| 2005/0095957 A1 | 5/2005 | Khoury | |
| 2006/0175294 A1 | 8/2006 | Tran et al. | |
| 2009/0298392 A1 * | 12/2009 | Okamoto | B24B 37/24 |
| | | | 451/41 |
| 2010/0120343 A1 * | 5/2010 | Kato | B24B 37/24 |
| | | | 451/533 |
| 2016/0016292 A1 | 1/2016 | Doi et al. | |

\* cited by examiner

THERMOPLASTIC POROMERIC POLISHING PAD

BACKGROUND

The present invention relates to chemical mechanical polishing pads and methods of forming the polishing pads. More particularly, the present invention relates to poromeric chemical mechanical polishing pads and methods of forming poromeric polishing pads.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes non-planar. Because subsequent semiconductor processing (e.g., photolithography) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

The CMP process usually occurs on a single polishing tool in two or three steps. The first step planarizes the wafer and removes the bulk of the excess material. After the planarization, the subsequent step or steps remove scratches or chattermarks introduced during the planarization step. The polishing pads used for these applications must be soft and conformal to polish the substrate without scratching. Furthermore, these polishing pads and slurries for these steps often require selective removal of material, such as a high TEOS to metal removal rate. For purposes of this specification, TEOS is the decomposition product of tetraethyloxysilicate. Since TEOS is a harder material than metals such as copper, this is a difficult problem that manufacturers have been addressing for years.

Over the last several years, semiconductor manufacturers have been moving increasingly to poromeric polishing pads, such as Politex™ and Optivision™ polyurethane pads for finishing or final polishing operations in which low defectivity is a more important requirement (Politex and Optivision are trademarks of Dow Electronic Materials or its affiliates.). For purposes of this specification the term poromeric refers to porous polyurethane polishing pads produced by coagulation from aqueous solutions, non-aqueous solutions or a combination of aqueous and non-aqueous solutions. The advantage of these polishing pads is that they provide efficient removal with low defectivity. This decrease in defectivity can result in a dramatic wafer yield increase.

A polishing application of particular importance is copper-barrier polishing in which low defectivity is required in combination with the ability to remove both copper and TEOS dielectric simultaneously, such that the TEOS removal rate is higher than the copper removal rate to satisfy advanced wafer integration designs. Commercial pads such as Politex polishing pads do not deliver sufficiently low defectivity for future designs nor is the TEOS:Cu selectivity ratio high enough. Other commercial pads contain surfactants that leach during polishing to produce excessive amounts of foam that disrupts polishing. Furthermore, the surfactants may contain alkali metals that can poison the dielectric and reduce the semiconductor's functional performance.

Despite the low TEOS removal rate associated with poromeric polishing pads, some advanced polishing applications are moving toward all-poromeric pad CMP polishing operations because of the potential of achieving lower defectivity with poromeric pads versus other pad types such as IC1000™ polishing pads. Although these operations provide low defects, the challenges remain to further decrease pad-induced defects and to increase polishing rate.

STATEMENT OF INVENTION

An aspect of the invention provides porous polyurethane polishing pad comprising: a porous matrix having large pores extending upward from a base surface and open to an upper surface, the large pores being interconnected with small pores, a portion of the large pores being open to a top polishing surface, the large pores extending to the top polishing surface having a substantially vertical orientation, the porous matrix being a blend that includes two thermoplastic polymers; a first thermoplastic polyurethane having by molecular percent, 45 to 60 adipic acid, 10 to 30 MDI-ethylene glycol and 15 to 35 MDI, the first thermoplastic polyurethane having an Mn of 40,000 to 60,000 and a Mw of 125,000 to 175,000 and an Mw to Mn ratio of 2.5 to 4; and a second thermoplastic polyurethane having by molecular percent, 40 to 50 adipic acid, 20 to 40 adipic acid butane diol, 5 to 20 MDI-ethylene glycol and 5 to 25 MDI, the second thermoplastic polyurethane having an Mn of 60,000 to 80,000 and a Mw of 125,000 to 175,000 and an Mw to Mn ratio of 1.5 to 3 and the second thermoplastic having a tensile modulus as measured at a tensile elongation of 100% (ASTM D886) of at least twenty percent less than the first thermoplastic polyurethane and the blend of the first and the second thermoplastic polyurethane having a tensile modulus as measured at a tensile elongation of 100% (ASTM D886) of at least thirty percent greater than the second thermoplastic polymer.

A second aspect of the invention provides a porous polyurethane polishing pad comprising: a porous matrix having large pores extending upward from a base surface and open to an upper surface, the large pores being interconnected with small pores, a portion of the large pores being open to a top polishing surface, the large pores extending to the top polishing surface having a substantially vertical orientation, the porous matrix being a blend that includes two thermoplastic polymers; a first thermoplastic polyurethane having by molecular percent, 45 to 60 adipic acid, 10 to 30 MDI-ethylene glycol and 15 to 35 MDI, the first thermoplastic polyurethane having an Mn of 45,000 to 55,000 and a Mw of 140,000 to 160,000 and an Mw to Mn ratio of 2.8 to 3.3; and a second thermoplastic polyurethane having by molecular percent, 40 to 50 adipic acid, 20 to 40 adipic acid butane diol, 5 to 20 MDI-ethylene glycol and 5 to 25 MDI, the second thermoplastic polyurethane having an Mn of 65,000 to 75,000 and a Mw of 140,000 to 160,000 and an Mw to Mn ratio of 1.8 to 2.4 and the second thermoplastic having a tensile modulus as measured at a tensile elongation of 100% (ASTM D886) of at least thirty percent less than the first thermoplastic polyurethane and the blend of the first and second thermoplastic polyurethane having a tensile modulus as measured at a tensile elongation of 100% of 8.5 to 14.5 MPa (ASTM D886) and the blend of the first and second thermoplastic polyurethane having a tensile modulus at a tensile elongation of 100% (ASTM D886) at least fifty percent greater than the second thermoplastic polymer.

DETAILED DESCRIPTION

Figure 1:
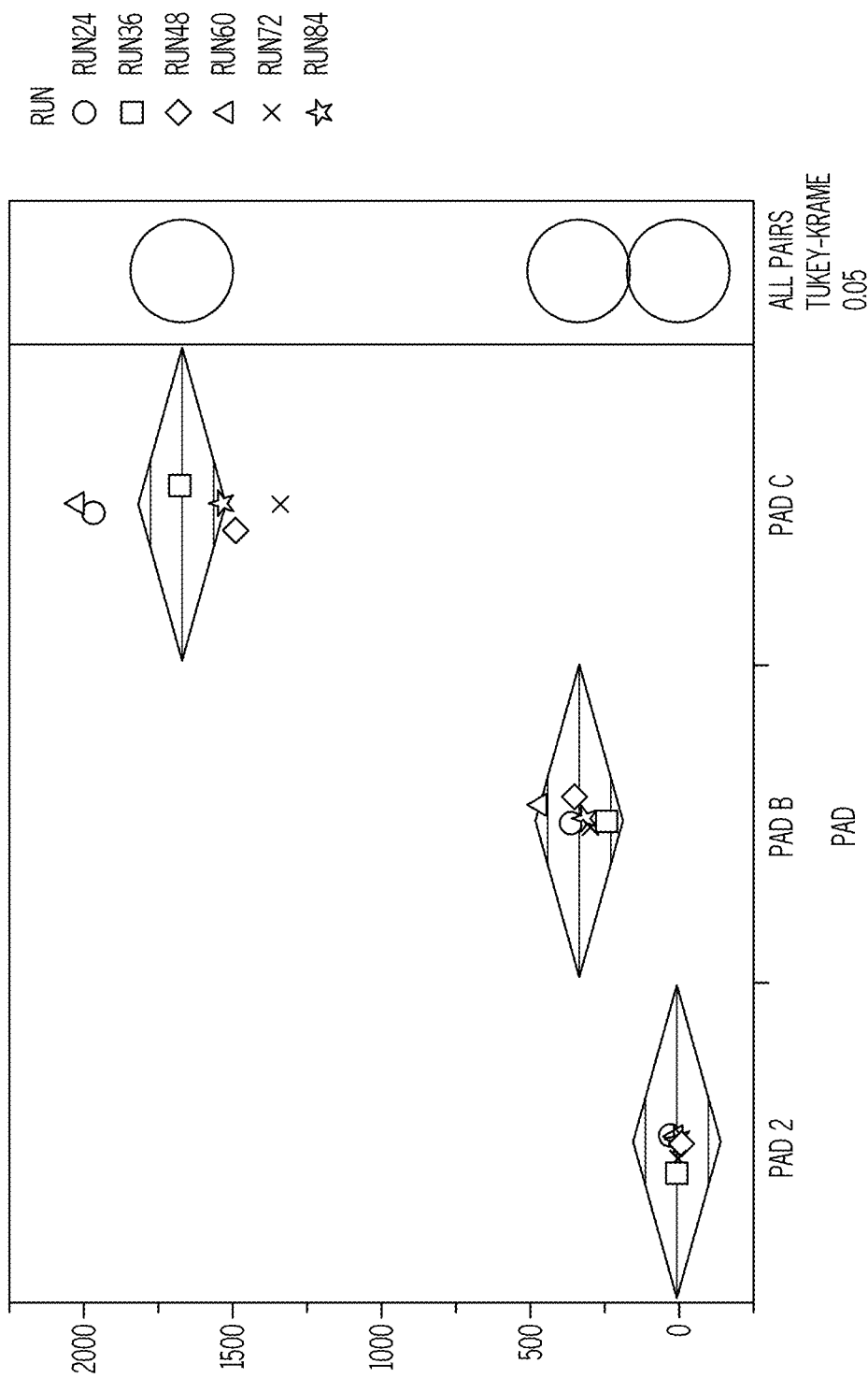
FIG. 1 is a polishing scratch plot illustrating the improvement in scratches and chattermarks obtained with the polishing pad of the invention.

The polishing pad of the invention is useful for polishing at least one of magnetic, optical and semiconductor substrates. In particular, the polyurethane pad is useful for polishing semiconductor wafers; and in particular, the pad is useful for polishing advanced applications such as copper-barrier applications in which very low defectivity is more important than the ability to planarize and in which it is necessary to remove multiple materials simultaneously such as copper, barrier metals and dielectric materials, including but not limited to TEOS, low k and ultra-low k dielectrics. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof. In order to avoid foaming issues and potential poisoning of the dielectric, these formulations are advantageously surfactant-free formulations. The polishing pad includes a porous polishing layer having a dual pore structure within a polyurethane matrix coated on a supporting base substrate. The dual pore structure has a primary set of larger pores and a secondary set of smaller pores within and between the cell walls of the larger pores. This dual porosity structure serves to reduce defects while increasing removal rate for some polishing systems.

The porous polishing layer is either fixed to a polymeric film substrate or formed onto a woven or non-woven structure to form the polishing pad. When depositing the porous polishing layer onto a polymeric substrate, such as a non-porous poly (ethyleneterephthalate) film or sheet, it is often advantageous to use a binder, such as a proprietary urethane or acrylic adhesive to increase adhesion to the film or sheet. Although these films or sheets may contain porosity, advantageously these films or sheets are non-porous. The advantage of non-porous films or sheets is that they promote uniform thickness or flatness, increase the overall stiffness and decrease the overall compressibility of the polishing pad, and eliminate slurry wicking effects during polishing.

In an alternative embodiment, a woven or non-woven structure serves as a base for the porous polishing layer. Although the use of non-porous films as the base substrate has benefits as outlined above, films also have disadvantages. Most notably, air bubbles can be trapped between the polishing pad and the platen of the polishing tool when non-porous films or porous substrates in combination with adhesive films are used as the base substrate. These air bubbles distort the polishing pad to create defects during polishing. Patterned release liners facilitate air removal to eliminate air bubbles under these circumstances. This results in major issues with polishing non-uniformity, higher defectivity, high pad wear and reduced pad life. These problems are eliminated when felt is used as the base substrate since air can permeate through the felt and air bubbles are not trapped. Secondly, when the polishing layer is applied to film the adhesion of the polishing layer to the film depends on the strength of the adhesive bond. Under some aggressive polishing conditions, this bond can fail and result in catastrophic failure. When felt is used the polishing layer actually penetrates a certain depth into the felt and forms a strong, mechanically interlocked interface. Although woven structures are acceptable, non-woven structures can provide additional surface area for strong bonding to the porous polymer substrate. An excellent example of a suitable non-woven structure is a polyester felt impregnated with a polyurethane to hold the fibers together. Typical polyester felts will have a thickness of 500 to 1500 μm.

The polishing pad of the invention is suitable for polishing or planarizing at least one of semiconductor, optical and magnetic substrates with a polishing fluid and relative motion between the polishing pad and the at least one of semiconductor, optical and magnetic substrates. The polishing layer has an open-cell polymeric matrix. At least a portion of the open-cell structure opens up to a polishing surface. The large pores extend to the polishing surface having a vertical orientation. These large pores contained within a coagulated polymer matrix form the nap layer to a specific nap height. The height of the vertical pores is equal to the nap layer height. The vertical pore orientation forms during the coagulation process. For purposes of this patent application, vertical or the up and down direction is orthogonal to the polishing surface. The vertical pores have an average diameter that increases with distance from or below the polishing surface. The polishing layer typically has a thickness of 20 to 200 mils (0.5 to 5 mm) and preferably 30 to 80 mils (0.76 to 2.0 mm). The open-cell polymeric matrix having vertical pores and open channels interconnecting the vertical pores. Preferably, the open-cell polymeric matrix has interconnecting pores with sufficient diameter to allow transport of fluids. These interconnecting pores have an average diameter much smaller than the average diameter of the vertical pores.

A plurality of grooves in the polishing layer facilitates the distribution of slurry and the removal of polishing debris. Preferably, the plurality of grooves forms an orthogonal grid pattern. Typically, these grooves form an X-Y coordinate grid pattern in the polishing layer. The grooves have an average width measured adjacent a polishing surface. The plurality of grooves has a debris removal dwell time where a point on the at least one of semiconductor, optical and magnetic substrates rotated at a fixed rate passes over the width of the plurality of grooves. A plurality of projecting land areas within the plurality of grooves are buttressed with tapered support structures that extends outward and downward from the top of or the plane of the polishing surface of the plurality of projecting land areas. Preferably, at a slope of 30 to 60 degrees as measured from a plane of the polishing surface. The plurality of land areas has a frusta or non-pointed top that forms the polishing surface from the polymer matrix containing the vertical pores. Typically, the projecting land areas have a shape selected from hemispherical, frusta-pyramidal, frusta-trapezoidal and combinations thereof with the plurality of grooves extending between the projecting land areas in a linear manner. The plurality of grooves has an average depth greater than the average height of the vertical pores. In addition, the vertical pores have an average diameter that increases at least one depth below the polishing surface.

Most preferably, a combination of the vertical pore diameter becoming larger with distance and the tapered support structure offset each other with respect to contact at the polishing surface. The increasing vertical pore diameter decreases polishing pad contact with pad wear. Opposite the vertical pore, the tapered surface structure results in an increase in polishing pad contact with increased pad wear. These offsetting forces facilitate polishing multiple wafers with a constant removal rate.

The plurality of projecting land areas have a polishing dwell time where a point on the at least one of semiconductor, optical and magnetic substrates rotated at the fixed rate passes over the plurality of projecting land areas. The plurality of projecting land areas has an average width less than the average width of the plurality of grooves for decreasing polishing dwell time of the projecting land areas and increasing the debris removal dwell time of the groove areas to a value greater than the polishing dwell time.

The grooves preferably form a series of pillow structures formed from the porous matrix including the large pores and the small pores. Preferably, the pillows are in a grid pattern, such as an X-Y coordinate grid pattern. The pillow structures have a downward surface from the top polishing surface for forming downwardly sloped side walls at an angle from 30 to 60 degrees from the polishing surface. The downwardly sloped side walls extend from all sides of the pillow structures. Preferably, the downwardly sloped side walls have an initial taper region of 5 to 30 degrees as measured from the polishing surface leading into the downwardly sloped side walls. Preferably, the downwardly sloped sides terminate in a horizontal groove bottom of polyurethane matrix, the groove bottom having a porosity less than the pillow structures. Most preferably, the bottoms of the grooves are smooth and lack open vertical or small pores. These smooth grooves facilitate efficient polishing removal without surface structures that can hold and accumulate polishing debris.

A portion of the large pores is open to the downwardly sloped side walls. The large pores open to the downwardly sloped sidewalls are less vertical than the large pores open to the top polishing surface and offset 10 to 60 degrees from the vertical direction in a direction more orthogonal to the sloped sidewalls. Leaving the pores open at the sidewalls allows free-flow of debris to facilitate a further reduction in defects. Preferably, the porous polyurethane polishing pads contain interconnected side pores having an average diameter sufficient to allow deionized water to flow between large pores.

The method of forming the porous polyurethane polishing pad is also critical for lowering defects. In the first step, coagulating a thermoplastic polyurethane creates a porous matrix that has large pores extending upward from a base surface and open to an upper surface. The large pores are interconnected with smaller pores. A portion of the large pores is open to a top polishing surface. The large pores extend to the top polishing surface having a substantially vertical orientation with respect to that surface.

The thermoplastic polyurethane has a softening onset temperature for allowing irreversible thermoplastic deformation. The softening onset temperature is determined using Thermal Mechanical Analysis (TMA) in accordance with ASTM E831. In particular, determining the initial TMA inflection point for change in slope provides the softening onset temperature—see FIG. 4. Preferably heating the press (used to form the grooves) is in a range of a temperature 10K below to 10K above the softening onset temperature of the thermoplastic polyurethane. More preferably, heating the press is in a range of a temperature 5K below to 5K above the softening onset temperature of the thermoplastic polyurethane. Most preferably, heating the press is in a range of a temperature 5K below to equal the softening onset temperature of the thermoplastic polyurethane.

Heating a press to a temperature near or above the softening onset temperature prepares the press for the thermoplastic deformation. Pressing the heated press against the thermoplastic polyurethane forms a series of pillow structures from the porous matrix that include the large pores and the small pores. The press can be a grooved cylinder that rotates around its central axis or a flat heated press. Preferably, the press is an aluminum alloy plate that compresses in a linear fashion to emboss the polishing pad. Plastic deforming side walls of the pillow structures form the downwardly sloped side walls. The downwardly sloped side walls extend from all sides of the pillow structures. A portion of the large pores are open to the downwardly sloped side walls. The large pores open to the downwardly sloped sidewalls are less vertical than the large pores open to the top polishing surface and offset 10 to 60 degrees from the vertical direction in a direction more orthogonal to the sloped sidewalls. Preferably, a majority of the small pores in the plastically deformed sidewalls remain open a distance of at least 100 μm as measured from a top of sidewalls at the polishing surface to the groove channels.

Finally, melting and solidifying the thermoplastic polyurethane at the bottom of the sloped sidewalls closes the majority of the large and small pores and forms the groove channels. Preferably, the plastic deforming of sidewalls and the melting and solidifying steps form a grid of interconnecting grooves. The groove channels' bottom surface have few or no open pores. This facilitates the smooth removal of the debris and locks the poromeric polishing pad into its open-pore-tapered-pillow structure. Preferably, the grooves form a series of pillow structures formed from the porous matrix including the large pores and the small pores. Preferably, the small pores have a diameter sufficient to allow flow of deionized water between vertical pores.

A base layer is critical to forming a proper foundation. The base layer can be polymeric film or sheet. But woven or non-woven fibers provide the best substrates for poromeric polishing pads. For purposes of this specification, poromerics are breathable synthetic leathers formed from aqueous substitution of an organic solvent. Non-woven felts provide excellent substrates for most applications. Typically, these substrates represent polyethylene terephthalate fibers formed by mixing, carding and needle punching.

For consistent properties, it is important that the felt has consistent thickness, density and compressibility. Forming felts from consistent fibers with consistent physical properties results in a base substrates having consistent compressibility. For additional consistency, it is possible to blend a shrinking fiber and a non-shrinking fiber, running the felt through a heated water bath to control the density of the felt. This has the advantage of using bath temperature and residence time to fine tune final felt density. After forming the felt, sending it through a polymer impregnation bath, such as an aqueous polyurethane solution coats the fibers. After coating the fibers, oven curing the felt adds stiffness and resilience.

Post-coating curing followed by a buffing step controls the felt thickness. For fine-tuning thickness, it is possible to first buff with a coarse grit, and then finish the felt with a fine grit. After buffing the felt, it is preferable to wash and dry the felt to remove any grit or debris picked up during the buffing step. Then after drying filing the backside with dimethylformamide (DMF) prepares the felt for a water proofing step. For example, perfluorocarboxylic acids and their precursors, such as AG-E092 repellant for textiles from AGC Chemicals can waterproof the top surface of the felt. After water proofing, the felt requires drying and then an optional burning step can remove any fiber ends that protrude through the felt's top layer. The waterproofed felt is then prepared for coating and coagulation.

A delivery system deposits polyurethane in DMF solvent on the waterproofed side of the felt. A doctor blade evens out the coating. Preferably the coated felt then passes through multiple coagulation troughs wherein water diffuses into the coating to form large pores interconnected with secondary pores. Then the felt, having a coagulated coating, passes through multiple wash tanks to remove the DMF. After DMF removal, oven drying cures the thermoplastic polyurethane. Optionally, a high-pressure wash and drying step further cleans the substrate.

After drying, a buffing step opens the pores to a controlled depth. This enables consistent pore counts on the top surface. During buffing, it is advantageous to use a stable abrasive that does not dislodge and work its way into the porous substrate. Typically diamond abrasives produce the most consistent texture and are least prone to breaking off during buffing. After buffing, the substrate has a typical nap height of 10 to 30 mils (0.25 to 0.76 mm) and a total thickness of 30 to 60 mils (0.76 to 1.52 mm). Average large pore diameter can range from 5 to 85 mils (0.13 to 2.2 mm). Typical density values are 0.2 to 0.5 g/cm$^3$. The cross-sectional pore area is typically 10 to 30 percent with a surface roughness Ra of less than 14 and Rp of less than 40. The polishing pad's hardness is preferably 40 to 74 Asker C.

The porous matrix is a blend that includes two thermoplastic polymers. The first thermoplastic polyurethane has by molecular percent, 45 to 60 adipic acid, 10 to 30 MDI-ethylene glycol and 15 to 35 MDI. The first thermoplastic polyurethane has an Mn of 40,000 to 60,000 and an Mw of 125,000 to 175,000 and an Mw to Mn ratio of 2.5 to 4. For purposes of this specification Mn and Mw represent number average and weight average molecular weight values respectively as determined by gel permeation chromatography. Preferably, the first thermoplastic has an Mn of 45,000 to 55,000 and an Mw of 140,000 to 160,000 and an Mw to Mn ratio of 2.8 to 3.3. Preferably, the first thermoplastic polyurethane has a tensile modulus of 8.5 to 14.5 MPa at a tensile elongation of 100% (ASTM D886). More preferably, the first thermoplastic polyurethane has a tensile modulus of 9 to 14 MPa at a tensile elongation of 100% (ASTM D886). Most preferably, the first thermoplastic polyurethane has a tensile modulus of 9.5 to 13.5 MPa at a tensile elongation of 100% (ASTM D886).

The second thermoplastic polyurethane has by molecular percent, 40 to 50 adipic acid, 20 to 40 adipic acid butane diol, 5 to 20 MDI-ethylene glycol and 5 to 25 MDI. The second thermoplastic polyurethane has an Mn of 60,000 to 80,000 and an Mw of 125,000 to 175,000 and an Mw to Mn ratio of 1.5 to 3. Preferably, the second thermoplastic polyurethane has an Mn of 65,000 to 75,000 and an Mw of 140,000 to 160,000 and an Mw to Mn ratio of 1.8 to 2.4. The second thermoplastic has a tensile modulus as measured at a tensile elongation of 100% (ASTM D886) of less than the first thermoplastic polyurethane and the blend of the first and second thermoplastic polyurethane has a tensile modulus at a tensile elongation at 100% (ASTM D886) greater than each of the individual components. Preferably, the second thermoplastic polyurethane has a tensile modulus of 4 to 8 MPa at a tensile elongation of 100% (ASTM D886). More preferably, the second thermoplastic polyurethane has a tensile modulus of 4.5 to 7.5 MPa at the tensile elongation of 100% (ASTM D886). Preferably the porous matrix is free of carbon black particles. Preferably, the first and second thermoplastic polymers have a distilled water contact angle of 65 degrees±5 degrees. Most preferably, the first and second thermoplastic polymers have a distilled water contact angle of 65 degrees±3 degrees.

Preferably, the second thermoplastic has a tensile modulus as measured at a tensile elongation of 100% (ASTM D886) of at least twenty percent less than the first thermoplastic polyurethane. Most preferably, the second thermoplastic has a tensile modulus as measured at a tensile elongation of 100% (ASTM D886) of at least thirty percent less than the first thermoplastic polyurethane.

Furthermore, the blend of the first and second thermoplastic polyurethane preferably has a tensile modulus at 100% tensile elongation (ASTM D886) of 8.5 to 12.5 MPa. The blend of the first and second thermoplastic polyurethane most preferably has a tensile modulus at 100% elongation (ASTM D886) of 9 to 12 MPa. The blend of the first and second thermoplastic polyurethane preferably has a tensile modulus at 100% tensile elongation (ASTM D886) that is at least thirty percent greater than the second thermoplastic. The blend of the first and second thermoplastic polyurethane preferably has a tensile modulus at 100% tensile elongation (ASTM D886) that is at least fifty percent greater than the second thermoplastic. Although equal proportions of the first and second thermoplastic polyurethane is most preferred, it is possible to increase either first or second thermoplastic polyurethane component to a concentration up to 50 wt % higher than the other component. But preferably, the increase in either the first or second thermoplastic polyurethane component is only to a concentration up to 20 wt % higher than the other component.

A mixture of anionic and nonionic surfactants preferably forms pores during coagulation and contributes to improved hard segment-soft segment formation and optimum physical properties. For anionic surfactants, the surface-active portion of the molecule bears a negative charge. Examples of anionic surfactants include but are not limited to carboxylic acid salts, sulfonic acid salts, sulfuric acid ester salts, phosphoric and polyphosphoric acid esters and fluorinated anionics. More specific examples include but are not limited to dioctyl sodium sulfosuccinate, sodium alkylbenzene sulfonate and salts of polyoxyethylenated fatty alcohol carboxylates. For nonionic surfactants, the surface-active portion bears no apparent ionic charge. Examples of nonionic surfactants include but are not limited to polyoxyethylene (POE) alkylphenols, POE straight-chain alcohols, POE polyoxypropylene glycols, POE mercaptans, long-chain carboxylic acid esters, alkanolamine alkanolamides, tertiary acetylenic glycols, POE silicones, N-alkylpyrrolidones and alkylpolyglycosides. More specific examples include but are not limited tomonoglyceride of long-chain fatty acid, polyoxethylenated alkylphenol, polyoxyethylenated alcohol and polyoxyethylene cetyl-stearyl ether. See for example, "Surfactants and Interfacial Phenomena", by Milton J. Rosen, Third Edition, Wiley-Interscience, 2004, Chapter 1 for a more complete description of anionic and nonionic surfactants.

Example 1

This example relied upon 1.5 mm thick poromeric polyurethane polishing pads having open-cell vertical pores with a mean pore area of 0.002 m$^2$ and a height of 0.39 mm. The polishing pads had a weight density of 0.409 g/mL. The polishing pads had embossed grooves to the dimensions of Table 1.

TABLE 1

| Dimension/Slope | Units | Pad A | Pad 1 |
| --- | --- | --- | --- |
| Pillow Width | μm | 1360 × 1360 | 1030 × 1030 |
| Groove Width at Polishing Surface | μm | 1200 | 1600 |
| Groove Depth | μm | 400 | 580 |
| Nap Layer (coagulation) Thickness | μm | 530 | 530 |
| Bottom pillar width | μm | 2150 | 2100 |
| Bottom groove width | μm | 490 | 440 |
| Groove Taper | Degrees | 45 | 45 |

The Table 1 embossed test pads were evaluated under oxide CMP process conditions for embossing depth style configuration. Each pad type was tested under the same process conditions. Performance wafers were examined for removal rate, non-uniformity percent (NU %), and defectivity with KLA-Tencor metrology tools. Polishing conditions were as follows:
 Pad Conditioner: . . . None
 Slurry: . . . Klebosol® 1730 (16%) Colloidal Silica Slurry; NH ILD 3225 (12.5%) Fumed Silica
 Filtration: . . . Pall 0.3 um StarKleen® POU
 Tool: . . . Applied Materials Reflexion®—DE MDC Lab
 Cleaning . . . SP1000 ATMI Inc
 Hydrogen Fluoride: one minute with etch rate of 200 angstrom/min.
 Films Metrology . . . KLA-Tencor™ FSX, thin films metrology
 Defect Metrology: . . . KLA-Tencor™ SP2XP, resolution to 0.12 um.
 KLA-Tencor™ eDR5200 SEM
 Wafers: . . . 300 mm Dummy Silicon wafers (sometimes with residual TEOS)
 300 mm Blanket TEOS 20K thickness wafers
 Targets:
 Removal Rate
 Non-uniformity percentage NU %
 Defectivity Counts (Post HF)
 Defectivity Classification (Post HF Chattermarks)
 Design of Experiment:
 Single platen testing with matched carriers used for all polishing.
 Process—60 sec ILD Polish 3 psi (20.7 kPa) & 5 psi (34.5 kPa)/93 rpm platen speed/87 rpm carrier speed/250 ml/min. slurry feed rate All pads and wafers were fully randomized for experiment.

Each Pad Run consisted of:
 Pad Break in with 20 dummy wafers 60 sec polish w/slurry a total time 20 minutes.
 Polishing Sequence (60 Sec polish)
 (A) 3 psi (20.7 kPa)/93 rpm platen speed/87 rpm carrier speed/250 ml/min slurry flow rate Blanket TEOS wafers
 (B) 5 psi (34.5 kPa)/93 rpm platen speed/87 rpm carrier speed/250 ml/min slurry flow rate Blanket TEOS Blanket TEOS wafers
 (C) 5 psi (34.5 kPa)/93 rpm platen speed/87 rpm carrier speed/250 ml/min slurry flow rate Blanket TEOS wafers
 (D) 5 psi (34.5 kPa)/93 rpm platen speed/87 rpm carrier speed/250 ml/min slurry flow rate Blanket TEOS wafers
 (E) 5 psi (34.5 kPa)/93 rpm platen speed/87 rpm carrier speed/250 ml/min slurry flow rate Blanket TEOS wafers
 (F) 3 psi (20.7 kPa)/93 rpm platen speed/87 rpm carrier speed/250 ml/min slurry flow rate Dummy TEOS wafers
 Sequence A-F Repeated for 1 Time
 Wafers measured for removal rate and NU % post CMP. TEOS wafers were additionally cleaned with an HF acid etch and sent for SP2 defect counts and SEM review. JMP software was used for the statistical analysis of the responses.

Removal Rate and within Wafer Non-Uniformity Review:
 Blanket TEOS wafers were evaluated for removal rate and NU % response under typical oxide polishing conditions. Film thickness was measured on the KLA-Tencor F5X™ tool. Measurement recipe of 65 points radially recipe with a 3 millimeter edge exclusion were used in the evaluation.

Defect Review:
 Blanket TEOS wafers were evaluated for defectivity response under typical oxide polishing conditions. Defectivity was measured on the KLA-Tencor SP2XP™ tool down to 0.10 μm particle size. SP2 wafer maps were manually reviewed to pre-classify defects and reduce unnecessary analysis, such as handling marks, large scratches and blobs.

Defect classifications images were collected by KLA-Tencor eDR5200 SEM. Because of the large number of defects, a review sampling plan was utilized for SEM image collection. A sampling plan provided a random sampling of one hundred defects from each wafer and sets rules for visits to clusters.

Defects were imaged at Field of View (FOV) 2 μm and re-imaged when needed at higher magnification. All collected defect images were manually classified.

JMP statistical software from SAS was used for the statistical analysis of the responses.

Results:

To assess the improvement of the Pad 1 embossed groove as compared to the Pad A embossed groove, the Pad 1 percent improvement of Mean defect counts were calculated by equation (1) below as follows:

Pad 1% Improvement=($X$ Pad $A$-$Y$ Pad 1)/$X$ Pad $A$*100%

Where X is the mean defect counts of Pad A for given test conditions and Y is the mean defect counts of the Pad 1 respectively.

Removal Rate: The TEOS removal rate collected for comparison of Pad 1 vs Pad A pads are shown in Table 2.

TABLE 2

Mean TEOS Removal Rate Pad 1 vs Pad A
Removal Rate (Å/Min)

| Film | Slurry | Process | Pad A | Pad 1 | % Improvement |
|---|---|---|---|---|---|
| TEOS | Colloidal Silica | A & F | 2581 | 2548 | ↓ 1.3% |
|  |  | B to D | 3363 | 3119 | ↓ 7.3% |
|  | Fumed Silica | A & F | 2468 | 2522 | ↑ 2.2% |
|  |  | B to D | 3795 | 3522 | ↓ 7.1% |

The Pad 1 pad exhibited slightly reduced removal rate as compared to the Pad A embossed pad under all experimental conditions with Klebosol 1730 colloidal slurry. The Pad 1 embossed pad exhibited an increase and decrease in removal rate on the 3 psi and 5 psi (20.7 kPa and 34.5 kPa)/process conditions respectively when compared to the Pad A embossed pad with ILD 3225 Fumed Silica slurry.

NU %: Non-Uniformity Percentage

The NU % represents a percentage calculated from the mean removal rate and its standard deviation. NU % and its differences are presented in Table 3 for the comparison of Pad 1 vs Pad A pads.

TABLE 3

Mean NU % Pad 1 vs Pad A
Mean TEOS Non-Uniformity Pad 1 vs Pad A

| Film | Slurry | Process | Pad A | Pad 1 | % Difference |
|---|---|---|---|---|---|
| TEOS | Colloidal Silica | A & F | 4.5% | 5.2% | ↑ 0.8% |
|  |  | B to D | 4.1% | 5.8% | ↑ 1.4% |
|  | Fumed Silica | A & F | 4.4% | 4.4% | No difference |
|  |  | B to D | 4.2% | 4.2% | No difference |

The Pad 1 pad exhibited slightly higher % difference in NU % as compared to the Pad A embossed pad under all experimental conditions with Klebosol 1730 colloidal slurry. The Pad 1 embossed pad exhibited no difference in NU % as compared to the Pad A embossed pad with ILD 3225 Fumed Silica slurry.

Post HF Defect Counts

The Total post HF Defect Counts collected for the comparison of Deep vs Standard Embossed Grooved polishing pads are shown in Table 4.

TABLE 4

Mean Defect Counts Pad 1 vs Pad A
Mean Total HF Defect Counts Pad 1 vs Pad A

| Film | Slurry | Process | Pad A | Pad 1 | % Improvement |
|---|---|---|---|---|---|
| TEOS | Colloidal Silica | A & F | 166.7 | 99.8 | ↓ 40% |
|  |  | B to D | 366.0 | 124.0 | ↓ 66% |
|  | Fumed Silica | A & F | 119.5 | 124.0 | ↑ 04% |
|  |  | B to D | 80.8 | 205.8 | ↑ 155% |

The Pad 1 embossed pad exhibited better than 40% defect count improvement as compared to the Pad A embossed pad under all experimental conditions with Klebosol 1730 colloidal slurry. The Pad 1 embossed pad showed a higher defect level as compared to the Pad A embossed pad under all experimental conditions with ILD 3225 Fumed Silica slurry.

Post HF Defect Classifications

Post HF TEOS wafers were classified by SEM images are shown in Table 5. One hundred randomly selected defects were collected and classified: chattermarks, scratches, particles, pad debris and organic residues etc. Chattermarks are recognized as the major defect associated to CMP window pads and their interaction with wafers. Post HF Chattermark defect counts are included in Table 5.

TABLE 5

Post HF Chattermark Counts for Pad 1 vs Pad A
Mean Total HF Chattermark Counts Pad 1 vs Pad A

| Film | Slurry | Process | Pad A | Pad 1 | % Improvement |
|---|---|---|---|---|---|
| TEOS | Colloidal Silica | A & F | 45.7 | 26.0 | ↓ 43% |
|  |  | B to D | 172.5 | 58.0 | ↓ 66% |
|  | Fumed Silica | A & F | 52.2 | 36.0 | ↓ 31% |
|  |  | B to D | 36.3 | 100.8 | ↑ 177% |

The Pad 1 embossed pad showed a decrease in chattermark counts as compared to the Pad A embossed pad under all experimental conditions with Klebosol 1730 colloidal slurry. The Pad 1 embossed pad showed an increase and decrease in chattermark counts by process conditions of 5 psi (34.5 kPa) and 3 psi (20.7 kPa), respectively as compared to the Pad A embossed pad under the same experimental conditions with ILD 3225 Fumed Silica slurry.

Conclusion:

Pad 1 embossed pads exhibited comparable to slightly reduced TEOS removal rates results when compared to Pad A embossed pads. Removal rate differences were attributed to higher down-force 5 psi (34.5 kPa) process conditions. The results highlighted in Table 4 and 5 show significantly lower defects of Pad 1 embossed pad in oxide CMP when compared to their respectively pad counterpart with Pad A embossed pads. Pad 1 embossed pads exhibited defect count improvements from 40% to 66% over Pad A embossed pads using K1730 colloidal silica slurry. The total defects generated by Pad A embossed pads were between 2.4 to 2.9 times higher as compared to the Pad 1 embossed pads in pad configurations.

The SEM defect classification was made for chattermarks defects commonly attributed to pad/wafer interactions. Pad 1 embossed pads exhibited 43 to 66% lower chattermark defect counts as compared to wafers polished with Pad A embossed pads using K1730 colloidal slurry. Pad 1 pads also showed 31% defect count reduction improvement using fumed silica slurry at 3 psi process conditions. The chattermark defect counts generated by Pad A embossed pads were between 1.7 to 2.4 times higher as compared to the Pad 1 embossed grooves in configured pads.

Example 2

A polyester felt roll having a thickness of 1.1 mm, a weight of 334 g/m2 and a density of 0.303 g/m3. The felt was a blend of two polyester fibers in a ratio of two parts shrinkable (−55% at 70° C.) to one part shrinkable (−2.5% at 70° C.). The first fiber had a weight of 2.11 dtex (kg/1000 m), a strength of 3.30 cN/dtex and an elongation ratio at fracture of 75%. The second fiber had a weight of 2.29 dtex (kg/1000 m), a strength of 2.91 cN/dtex and an elongation ratio at fracture of 110%. Coating the felt with AG-E092 perfluorocarboxylic acids and their precursors, waterproofed the top surface of the felt. After water proofing, the felt was dried and burned to remove any fiber ends that protrude through the felt's top layer.

A series of poromeric polishing pads were manufactured from a blend of thermoplastics in a dimethyl formamide solvent and embossed to the dimensions of Pad 3-2 of Example 3. Table 6 provides the list of thermoplastic polyurethane constituents tested and their molar formulations. Samprene and Crison are trademarks of Sanyo Chemical Industry and DIC respectively.

TABLE 6

| Ingredient | Samprene LQ-660 (Mol %) | Crison PS-542U (Mol %) | Samprene LQ-202 (Mol %) |
|---|---|---|---|
| Adipic acid ethylene glycol | 55.7 | | 45.9 |
| Adipic Acid butane diol | | | 26.8 |
| Methylene diphenyl diisocyanate-ethylene glycol | 19.7 | 18.6 | 11.8 |
| Methylene diphenyl diisocyanate (total) | 24.6 | 23.7 | 15.5 |
| Adipic acid-diethylene glycol | | 57.7 | |

Table 7 shows that the above components tested by gel permeation chromatography "GPC" were as follows:

TABLE 7

| Polyurethane | Mn | Mw | Mw/Mn |
|---|---|---|---|
| LQ-660 | 49,490 | 156,630 | 3.16 |
| LQ-202 | 78,930 | 168,320 | 2.13 |
| PS-542U | 56,460 | 151,380 | 2.68 |

HPLC system: Agilent 1100
Column: 2×PLgel 5μ, Mixed-D (300×8 mm ID) with 5μ guard
Eluent: Tetrahydrofuran
Flow rate: 1.0 mL/min
Detection: RI @ 40° C.
Injected volume of sample solution: 100 μL.
Calibration standard: Polystyrene
Table 8 provides physical properties of the ingredients and 50:50 blend.

TABLE 8

| PU/Blend | 100% Modulus, MPa (ASTM D886) |
|---|---|
| LQ660 | 10.8 |
| LQ202 | 6.3 |
| LQ660/LQ202 50:50 wt % | 8 |
| Pad 2 | 10.1 |

In a follow-up test, adding carbon black particles to the blend had little impact on the physical properties.
Table 9 provides a series of polishing pad formulations.

TABLE 9

| | | | Total 100phr | | |
|---|---|---|---|---|---|
| | | | Pad 2 | Pad B | Pad C |
| Polyurethane | LQ-660 | Sanyo | 32.8 | 30.5 | 30.5 |
| | LQ-202 | Sanyo | 32.8 | | |
| | PS-542U | DIC | | 30.5 | 30.5 |
| Carbon | L3270 | DIC | 0.0 | 6.1 | 6.1 |
| Surfactant | CUT30 | Dainichi | 0.3 | 1.2 | 1.8 |
| | PL220 | Kao | 1.3 | 1.2 | 0.6 |
| Solvent | DMF | na | 32.8 | 30.5 | 30.5 |
| | Total | | 100.0 | 100.0 | 100.0 |

LQ-660, LQ-220 and PS542U at 30 weight percent solids with balance dimethyl formamide (DMF); L3270 at 20 weight percent solids with balance dimethyl formamide (DMF), CUT30 is 69.5 to 73.5 wt % dioctyl sodium sulfosuccinate anionic surfactant with 10 to 20 wt % ethylene glycol by DIC and PL220 is polyoxyethylene cetyl-stearyl ether having an hydrophile-lipophile balance (HLB) of 16.1 from KAO.

The polishing conditions were as follows:
1. Polisher: Reflexion LK, Contour head
2. Slurry: LK393C4 colloidal silica barrier slurry.
3. Pad break-in:
   i. 73 rpm platen speed/111 rpm carrier speed, 2 psi (13.8 kPa) downforce, 10 min, HPR on
4. Conditioning:
   i. 121 rpm platen speed/108 rpm carrier speed, 3 psi (20.7 kPa) downforce 6.3 sec_A82+26 sec_HPR only
5. Cu blanket sheet pre-polish: polish with VP6000 polyurethane polishing pad/Planar CSL9044C colloidal silica slurry, ~4000 Å removal.
6. Alternate Cu and TEOS dummy.
7. Methodology: Pad break-in→collect removal rate and defect at various wafer run numbers.

All the polishing pads had an excellent combination of copper and TEOS removal rates as seen in Table 10.

TABLE 10

| Pad | Copper RR (Å/min.) Average | Copper RR (Å/min.) Range | TEOS RR (Å/min.) Average | TEOS RR (Å/min.) Range |
|---|---|---|---|---|
| Pad 2 | 768 | 53 | 1446 | 30 |
| Pad B | 924 | 74 | 1442 | 10 |
| Pad C | 755 | 99 | 1212 | 49 |

Increasing the amount of dioctyl sodium sulfosuccinate decreased size of the vertical pores and decreased TEOS rate. Increasing the amount of polyoxyethylene cetyl-stearyl ether increased the size of the vertical pores and increased TEOS rate. Increasing the ratio of dioctyl sodium sulfosuccinate to polyoxyethylene cetyl-stearyl ether decreased size of the vertical pores and decreased TEOS rate. The Pad 2 embossed pad, however produced the lowest number of defects as seen in Table 11.

TABLE 11

| Pad | Number of Wafers | Defects Means | Defect Std. Dev. |
|---|---|---|---|
| Pad 2 | 6 | 18 | 8 |
| Pad B | 6 | 347 | 74 |
| Pad C | 6 | 1676 | 275 |

FIG. 1 plots the improvement in defects provided with the Pad 2 embossed polishing pad. The Pad 2 embossed pad did not accumulate polishing debris. Pads B and C each accumulated polishing debris in the secondary pores and matrix. This accumulation of polishing debris appeared to be a fundamental driver for creating polishing defects. Pad 2 had a significant reduction in defect count without loss of copper or TEOS removal rates as compared to comparative Pads B and C.

Example 3

A commercial poromeric polishing pad "D" and two pads of Example 2 (Pad 3; Pad 3-1 and Pad 3-2) were embossed to different dimensions. Pad 3-1 had an embossed design where pillow width exceeded groove width as measured at the polishing surface and Pad 3-2 had an embossed design where groove width exceeded pillow width as measured at the polishing surface.

TABLE 12

| Dimension/Slope | Units | Pad D | Pad 3-1 | Pad 3-2 |
|---|---|---|---|---|
| Pillow Width | μm | 2750 × 2750 | 1480 × 1480 | 1135 × 1135 |
| Groove Width at Polishing Surface | μm | 1250 | 1026 | 1500 |
| Groove Depth | μm | 450 | 342 | 480 |
| Nap Layer (coagulation) Thickness | μm | 720 | 489 | 489 |
| Bottom pillar width | μm | | 2164 | 2095 |
| Bottom groove width | μm | | 309 | 572 |
| Groove Taper | Degrees | 0 | 45 | 45 |

Figure 2:
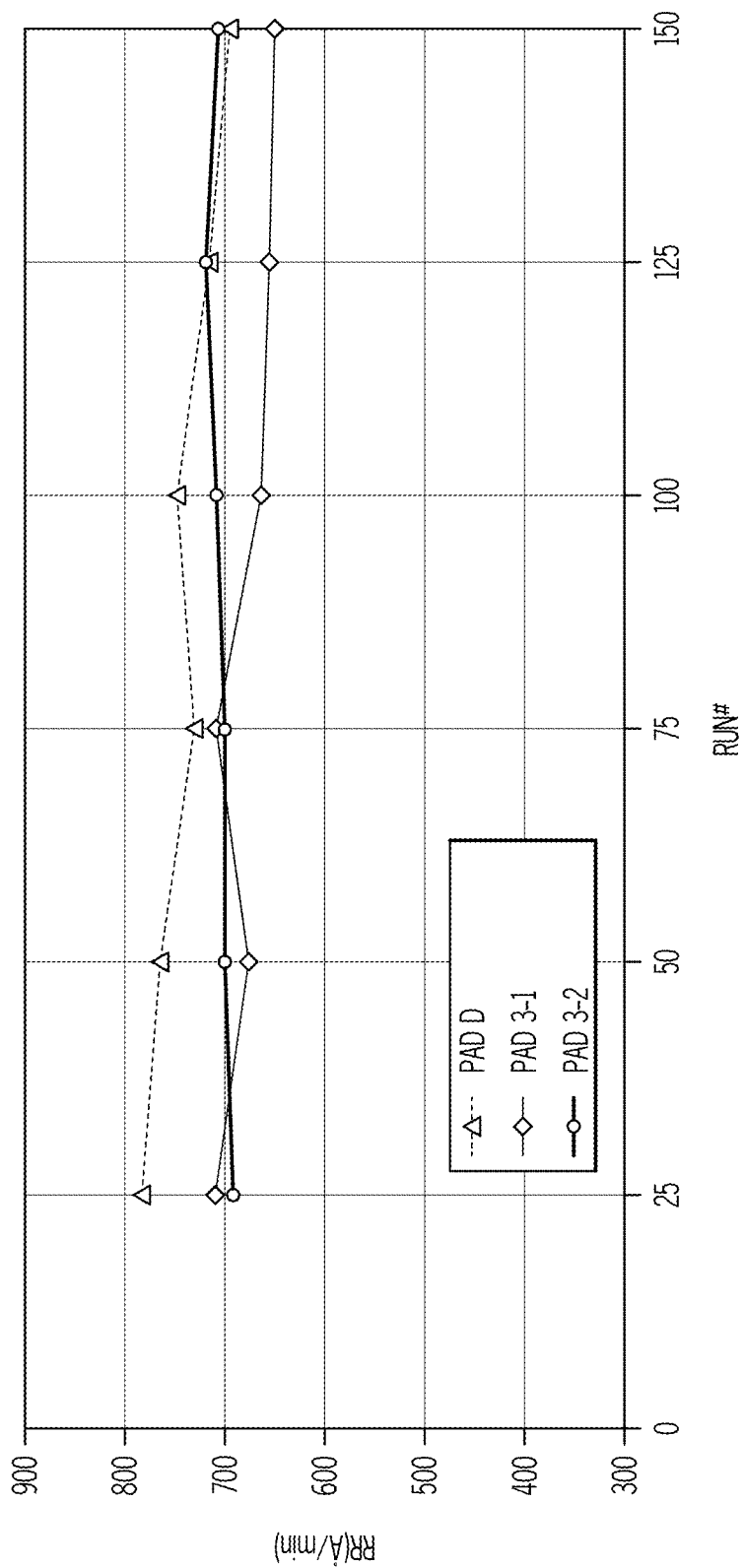
FIG. 2 is a plot illustrating copper removal rate stability for polishing pads of the invention.

The pads were then polished under the conditions of Example 2. As shown in Table 13 and FIG. 2, Pad 3-2 exhibited the best Cu rate stability. Thus, deep embossing pad, with groove width exceeding pillow width, delivered a slightly higher Cu rate.

TABLE 13

| Cu Removal Rate (Å) | Wafer No. 25 | Wafer No. 50 | Wafer No. 75 | Wafer No. 100 | Wafer No. 125 | Wafer No. 150 | Avg. Removal Rate (Å) | Range (Å) |
|---|---|---|---|---|---|---|---|---|
| Pad D | 787 | 767 | 733 | 750 | 715 | 700 | 742 | 87 |
| Pad 3-1 | 710 | 677 | 708 | 665 | 656 | 654 | 678 | 59 |
| Pad 3-2 | 694 | 699 | 705 | 710 | 719 | 708 | 706 | 24 |

In particular, Pad 3-2 demonstrated a tighter range for copper removal rate less than one third of commercial pad D with increasing Cu wafer count.

Figure 3:
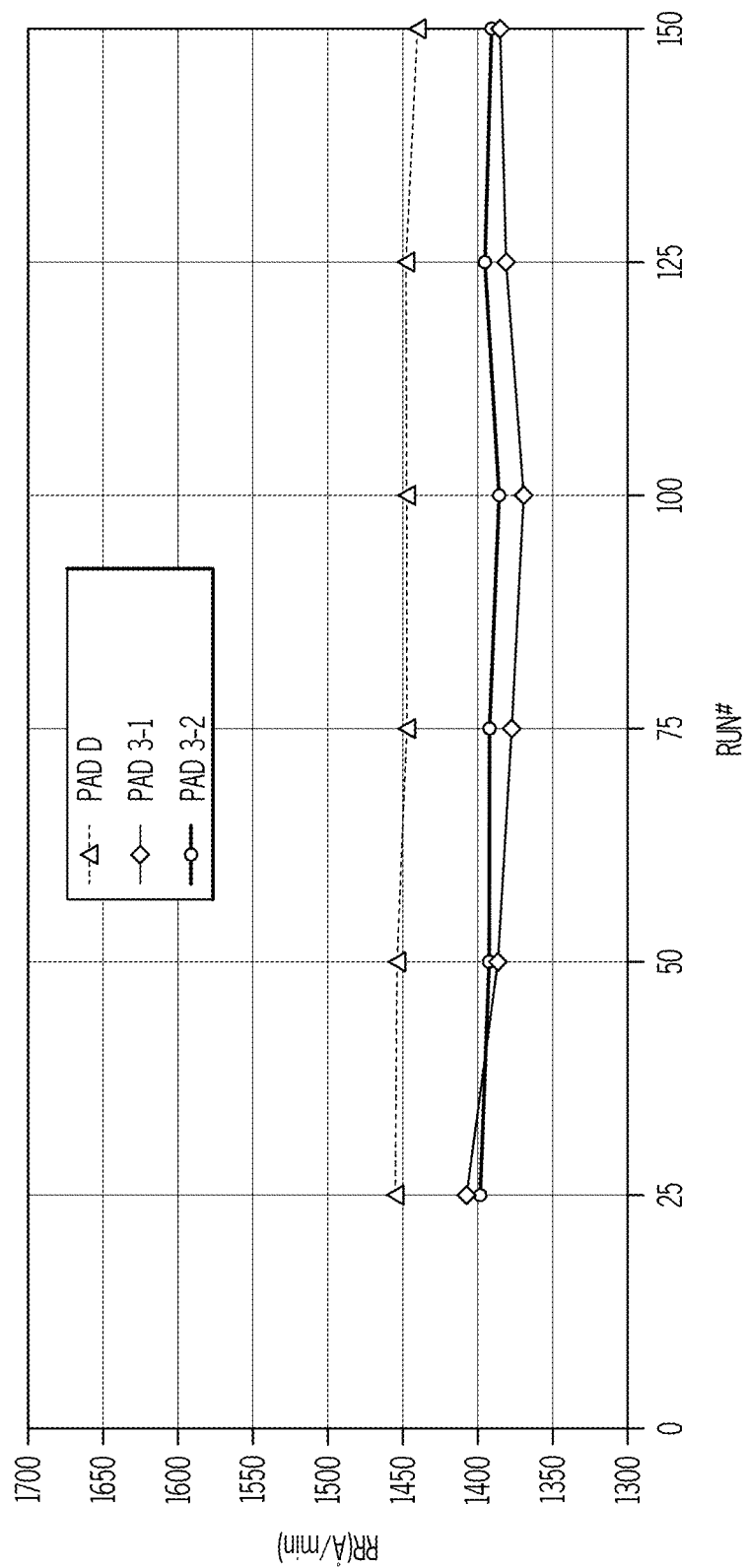
FIG. 3 is a plot illustrating TEOS removal rate stability for polishing pads of the invention.

As shown in FIG. 3, all the test pads exhibited good TEOS rate stability. But Pad 3-2 exhibited the best TEOS rate stability for extended polishing periods.

TABLE 14

| Pad | Wafers Total | Mean Scratch Count | Std. Dev. |
|---|---|---|---|
| D | 6 | 19.2 | 15.3 |
| 3-1 | 6 | 16.5 | 18.8 |
| 3-2 | 6 | 11.7 | 8.7 |

As shown in Table 14, Pad 3-2 revealed the lowest scratch average count. Pad 3-2 exhibited a lower scratch count than the commercial poromeric polishing pad D.

Conclusion:

Embossed Pad 3-2 performed the best for Cu and TEOS rate stability. In addition, Pad 3-2 having the increased groove width to pillow width pad as measured at the plane of the polishing surface, delivered slightly higher Cu and TEOS rates than the standard embossing design. Pad 3-2 provided the lowest scratch average count and importantly exhibited a significantly lower scratch count than commercial pad D.

Example 4

Figure 4:
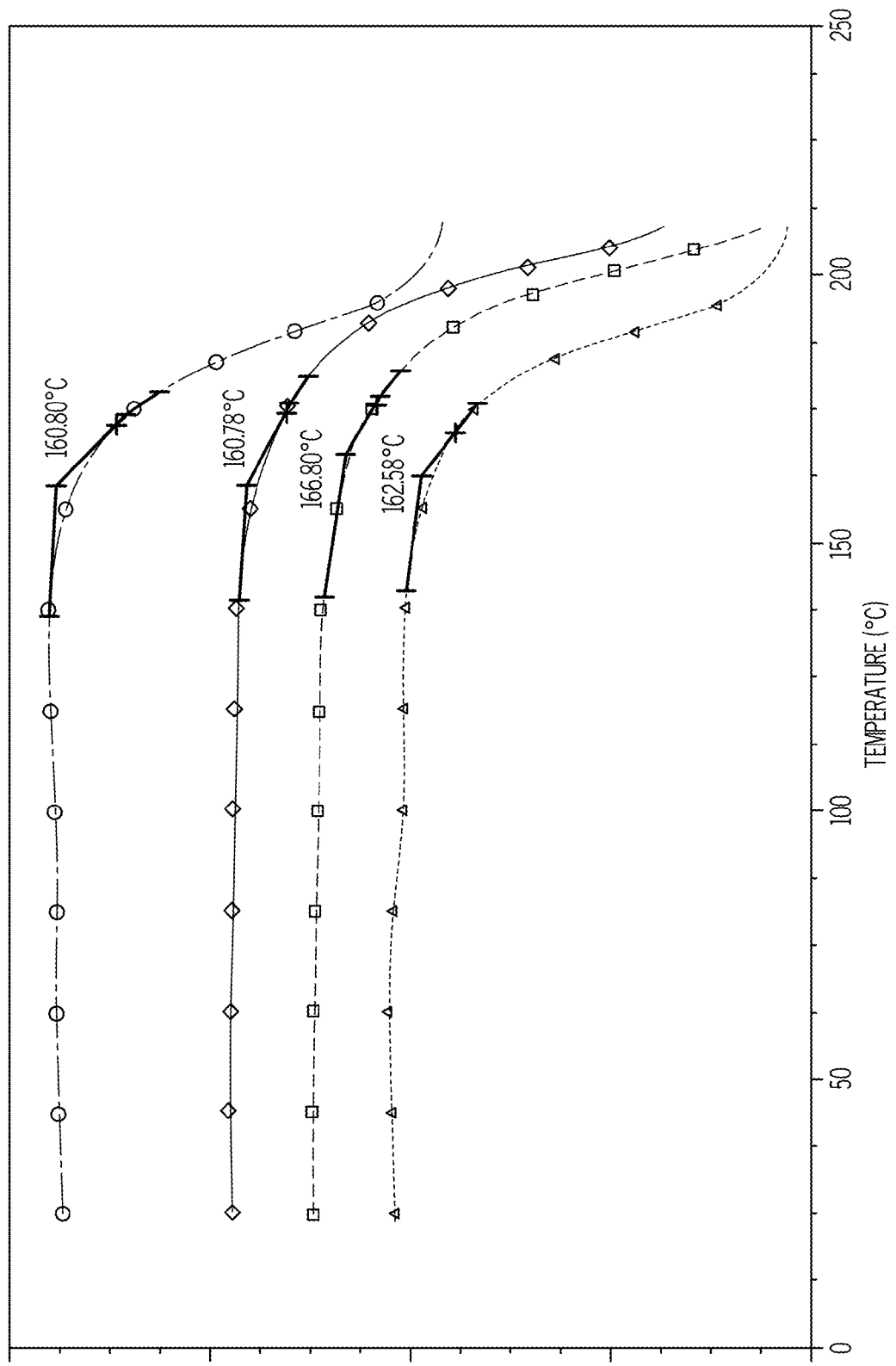
FIG. 4 illustrates a TMA method for determining a softening onset temperature.
Figure 5A:
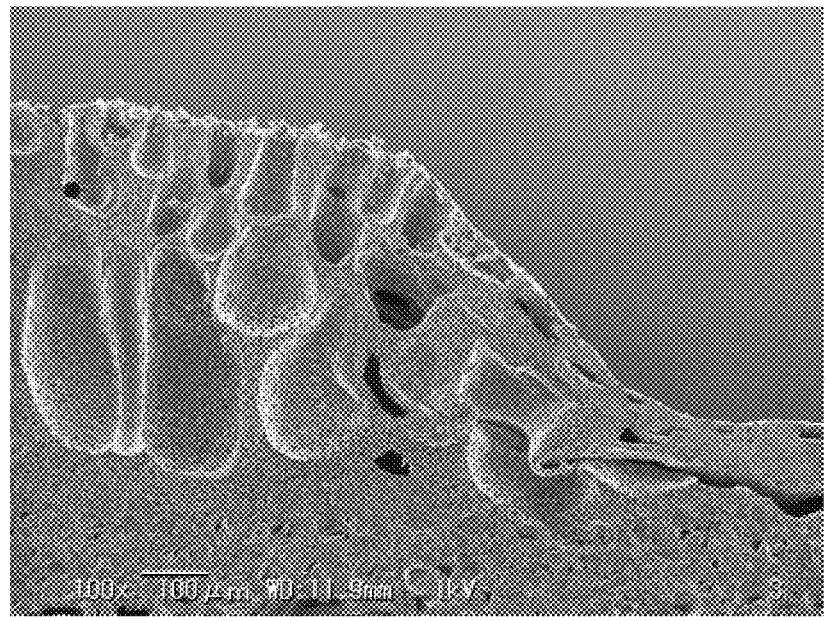
FIG. 5A is a low magnification SEM embossed at a temperature below the average softening onset temperature.
Figure 5B:
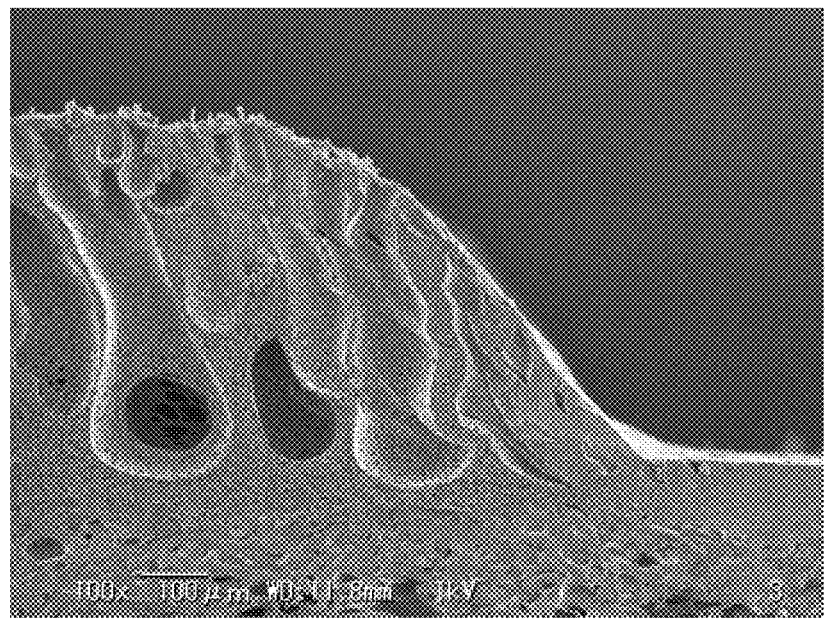
FIG. 5B is a low magnification SEM embossed at a temperature above the average softening onset temperature.

Four samples of the polyurethane (Pad 3) of Example 2 had an average softening onset temperature of 162° C. using TMA in accordance with ASTM E831, by measuring the inflection point as shown in FIG. 4. Two pads of Example 2 were embossed with metal dies heated to 160° C. (FIGS. 5A, 6A and 7A) (Pad 4) and 175° C. (FIGS. 5B, 6B and 7B) (Similar to Pad 3-2) to form pads with near identical pillow heights and groove widths as measured at the plane of the polishing surface (i.e. at temperatures below and above the TMA softening onset temperature). FIGS. 5A and 5B demonstrate the dramatic shift in groove formation achieved by limiting the amount of superheat above the melting onset temperature. The sidewalls embossed at 175° C. had melting as a primary forming mechanism where all vertical pores tend to remain vertical. This can be seen by the vertical pores in the center of the pillow and the tapered side walls of the pillow. The sidewalls formed at 160° C. had plastic deformation in combination with melting as the mechanism for forming the pillows. Evidence of the plastic deformation includes the pores bending toward orthogonal to the tapered grooves and the associated pillow height reduction that occurred adjacent the tapered sidewalls.

Figure 6A:
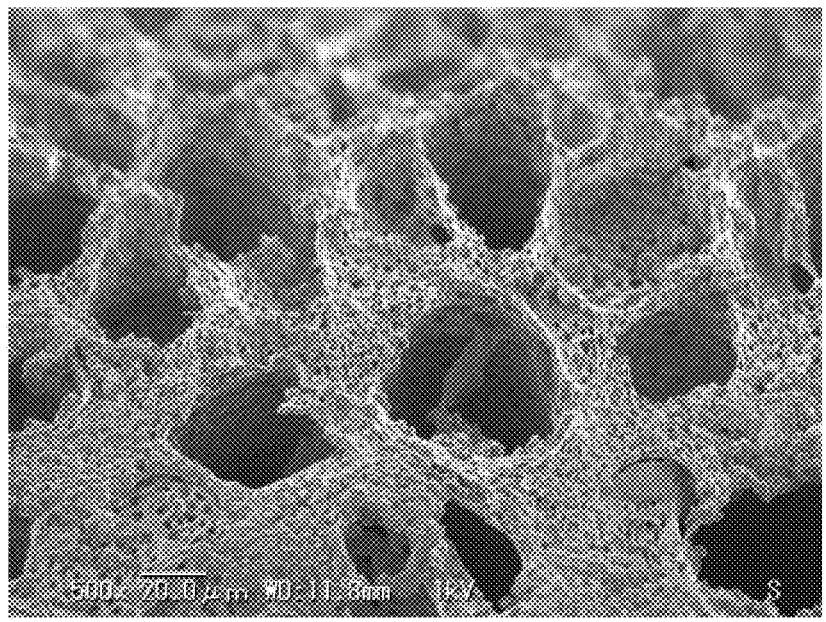
FIG. 6A is a high magnification SEM embossed at a temperature below the average softening onset temperature.
Figure 6B:
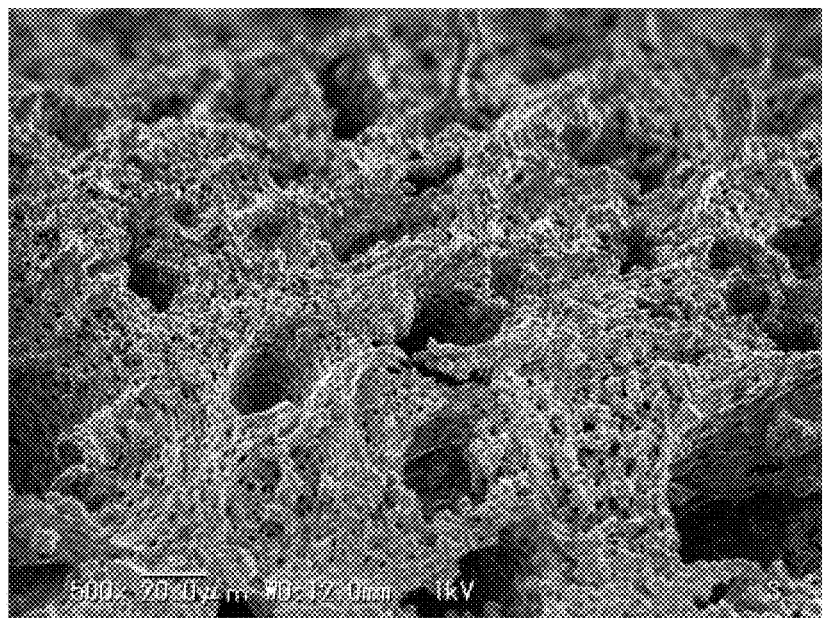
FIG. 6B is a high magnification SEM embossed at a temperature above the average softening onset temperature.

As seen in the high magnification SEMs of FIGS. 6A and 6B, the polishing pads embossed at a temperature below the average softening onset temperature maintained the combination of large pores plus interconnecting smaller pores. This was evident by the reduction in size of the primary pores and the coarsening of side walls seen in FIG. 6B.

Figure 7A:
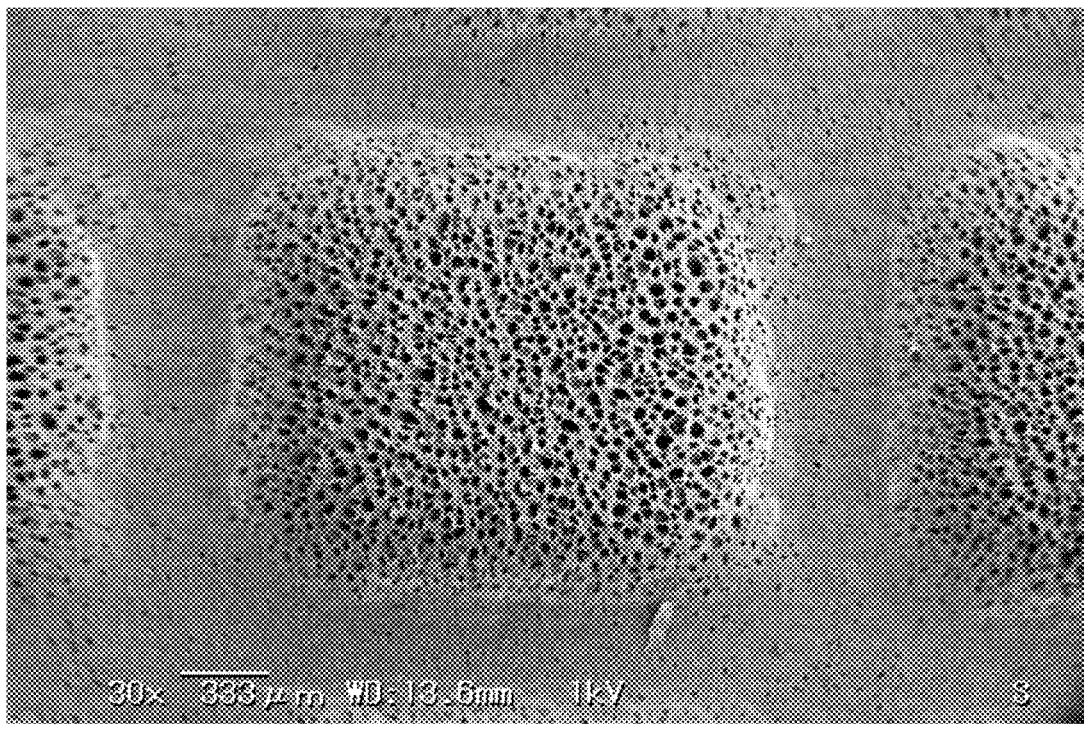
FIG. 7A is a low magnification SEM embossed at a temperature below the average softening onset temperature illustrating the smooth groove bottom surface.
Figure 7B:
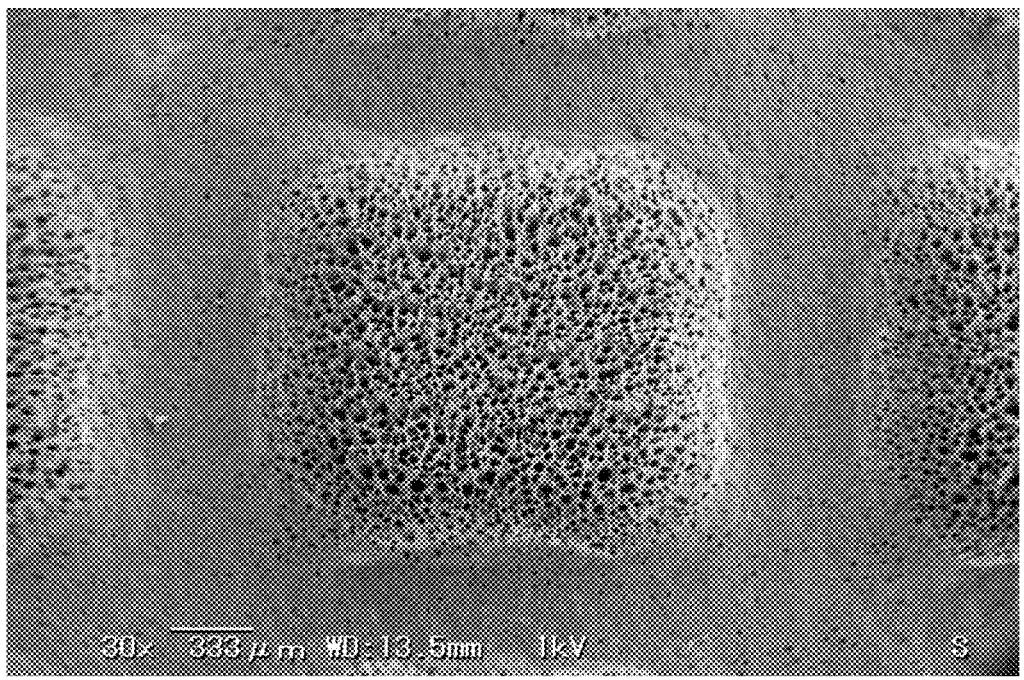
FIG. 7B is a low magnification SEM embossed at a temperature above the average softening onset temperature illustrating the smooth groove bottom surface.

As seen in FIGS. 7A and 7B, all polishing pads had melted lower groove surfaces. The melting of the bottom groove most likely locked the pillow in position and limited bounce-back of the pillow structure. Furthermore, the smooth bottom helped remove debris without creating crevices where the debris can accumulate and agglomerate, depending upon the slurry system. The pads embossed at 175° C. all had smooth melted groove bottoms and sidewalls at the lower extremities. The smooth walls, however resulted in coarsening of sidewall that was sufficient to reduce the entire pillow size.

Figure 8:
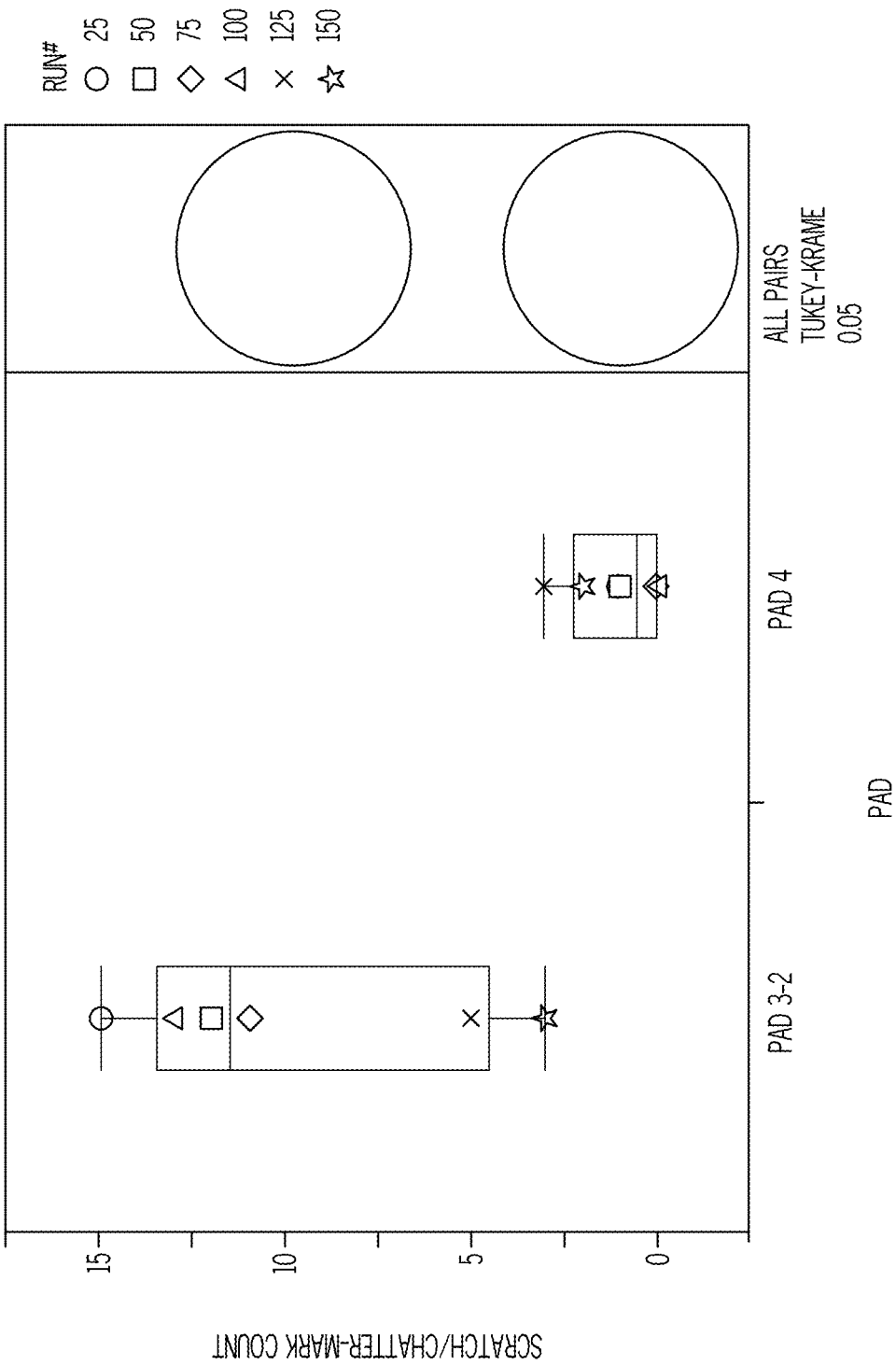
FIG. 8 illustrates the lower defects achieved with the structure of FIGS. 5A, 6A and 7A versus 5B, 6B and 7B.

To compare the embossed pads, polishing pads of FIGS. 5A, 6A and 7A and FIGS. 5B, 6B and 7B were polished under conditions the same as in Examples 2 and 3. As shown in FIG. 8, the pad embossed below the softening onset temperature, Pad 4, delivered significantly lower scratch count than Pad 3-2 of Example 3.

The invention is efficacious for ultra-low defect copper-barrier polishing. In particular, the pad polishes with excellent copper and TEOS rates that remain stable for multiple wafers. Furthermore, the pads have significantly lower scratch and chattermark defects than conventional polishing pads.

We claim:

1. A porous polyurethane polishing pad comprising:
    a porous matrix having large pores extending upward from a base surface and open to an upper surface, the large pores being interconnected with small pores, a portion of the large pores being open to a top polishing surface, the large pores extending to the top polishing surface having a substantially vertical orientation, the porous matrix being a blend that includes two thermoplastic polymers;
    a first thermoplastic polyurethane having by molecular percent, 45 to 60 adipic acid, 10 to 30 MDI-ethylene glycol and 15 to 35 MDI, the first thermoplastic polyurethane having an Mn of 40,000 to 60,000 and a Mw of 125,000 to 175,000 and an Mw to Mn ratio of 2.5 to 4; and
    a second thermoplastic polyurethane having by molecular percent, 40 to 50 adipic acid, 20 to 40 adipic acid butane diol, 5 to 20 MDI-ethylene glycol and 5 to 25 MDI, the second thermoplastic polyurethane having an Mn of 60,000 to 80,000 and a Mw of 125,000 to 175,000 and an Mw to Mn ratio of 1.5 to 3 and the second thermoplastic having a tensile modulus as measured a tensile elongation of 100% (ASTM D886) of at least twenty percent less than the first thermoplastic polyurethane and the blend of the first and second thermoplastic polyurethane having a tensile modulus as measured at a tensile elongation of 100% (ASTM D886) of at least thirty percent greater than the second thermoplastic polymer.

2. The polishing pad of claim 1 wherein the porous matrix is coagulated on a water impermeable top layer and the water impermeable top layer coats a non-woven felt substrate and the non-woven felt substrate includes polymeric fibers.

3. The polishing pad of claim 1 wherein the first thermoplastic polyurethane has a tensile modulus of 8.5 to 14.5 MPa at a tensile elongation of 100% (ASTM D886).

4. The polishing pad of claim 1 wherein the second thermoplastic polyurethane has a tensile modulus of 4 to 8 MPa at a tensile elongation of 100% (ASTM D886).

5. The polishing pad of claim 1 wherein the first and second thermoplastic polymers have a distilled water contact angle of 65 degrees±5 degrees.

6. A porous polyurethane polishing pad comprising:
    a porous matrix having large pores extending upward from a base surface and open to an upper surface, the large pores being interconnected with small pores, a portion of the large pores being open to a top polishing surface, the large pores extending to the top polishing surface having a substantially vertical orientation, the porous matrix being a blend that includes two thermoplastic polymers;
    a first thermoplastic polyurethane having by molecular percent, 45 to 60 adipic acid, 10 to 30 MDI-ethylene glycol and 15 to 35 MDI, the first thermoplastic polyurethane having an Mn of 45,000 to 55,000 and a Mw of 140,000 to 160,000 and an Mw to Mn ratio of 2.8 to 3.3; and
    a second thermoplastic polyurethane having by molecular percent, 40 to 50 adipic acid, 20 to 40 adipic acid butane diol, 5 to 20 MDI-ethylene glycol and 5 to 25 MDI, the second thermoplastic polyurethane having an Mn of 65,000 to 75,000 and a Mw of 140,000 to 160,000 and an Mw to Mn ratio of 1.8 to 2.4 and the second thermoplastic having a tensile modulus as measured at a tensile elongation of 100% (ASTM D886) of at least thirty percent less than the first thermoplastic polyurethane and the blend of the first and second thermoplastic polyurethane having a tensile modulus as measured at a tensile elongation of 100% (ASTM D886) of 8.5 to 14.5 MPa and the blend of the first and second thermoplastic polyurethane having a tensile modulus at a tensile elongation of 100% (ASTM D886) at least fifty percent greater than the second thermoplastic polymer.

7. The polishing pad of claim 6 wherein the porous matrix is coagulated on a water impermeable top layer and the water impermeable top layer coats a non-woven felt substrate and the non-woven felt substrate includes polymeric fibers.

8. The polishing pad of claim 6 wherein the first thermoplastic polyurethane has a tensile modulus of 9.5 to 13.5 MPa at a tensile elongation of 100% (ASTM D886).

9. The polishing pad of claim 6 wherein the second thermoplastic polyurethane has a tensile modulus of 4.5 to 7.5 MPa at a tensile elongation of 100% (ASTM D886).

10. The polishing pad of claim 6 wherein the first and second thermoplastic polymers have a distilled water contact angle of 65 degrees±3 degrees.

* * * * *